United States Patent [19]
Normoyle et al.

[11] Patent Number: 5,884,100
[45] Date of Patent: Mar. 16, 1999

[54] LOW-LATENCY, HIGH-THROUGHPUT, INTEGRATED CACHE COHERENT I/O SYSTEM FOR A SINGLE-CHIP PROCESSOR

[75] Inventors: Kevin B. Normoyle, Santa Clara; Michael A. Csoppenszky, Los Gatos; Jaybharat Boddu, Santa Clara; Jui-Cheng Su, Sunnyvale; Alex S. Han, San Jose; Rajasekhar Cherabuddi, Sunnyvale; Tzungren Tzeng, San Jose, all of Calif.

[73] Assignee: Sun Microsystems, Inc., Mountain View, Calif.

[21] Appl. No.: 660,026

[22] Filed: Jun. 6, 1996

[51] Int. Cl.⁶ ...................................................... G06F 13/00
[52] U.S. Cl. ........................... 395/872; 395/878; 395/881; 395/551; 395/559
[58] Field of Search ............................... 395/500, 200.64, 395/872, 878, 881, 551, 559; 364/239.1, 270.6, 270.8

[56] References Cited

U.S. PATENT DOCUMENTS

| 3,715,729 | 2/1973 | Mercy | 395/553 |
|---|---|---|---|
| 4,873,703 | 10/1989 | Crandall et al. | 375/371 |
| 4,932,040 | 6/1990 | Barlow | 375/362 |
| 5,276,842 | 1/1994 | Sugita | 395/425 |
| 5,305,452 | 4/1994 | Khan et al. | 395/551 |
| 5,434,996 | 7/1995 | Bell | 395/551 |
| 5,444,860 | 8/1995 | Datwyler et al. | 395/872 |
| 5,459,851 | 10/1995 | Nakajima et al. | 395/476 |
| 5,524,270 | 6/1996 | Haess et al. | 395/308 |
| 5,537,581 | 7/1996 | Conary et al. | 395/556 |
| 5,630,107 | 5/1997 | Carmean et al. | 395/560 |
| 5,659,711 | 8/1997 | Sugita | 395/476 |

OTHER PUBLICATIONS

M. Morris Mano, Comuter System Architecture (3rd ed. 1993), pp. 415–420, 446, 476–483, 1993.

Primary Examiner—Lance Leonard Barry, Esq.
Attorney, Agent, or Firm—Skjerven, Morrill, MacPherson, Franklin & Friel; David T. Millers

[57] ABSTRACT

A single-chip central processing unit (CPU) includes a processing core and a complete cache-coherent I/O system that operates asynchronously with the processing core. An internal communications protocol uses synchronizers and data buffers to transfer information between a clock domain of the processing core and a clock domain of the I/O system. The synchronizers transfer control and handshake signal between clock domains, but the data buffer transfers data without input or output synchronization circuitry for data bits. Throughput for the system is high because the processing unit has direct access to I/O system so that no delays are incurred for complex mechanisms which are commonly employed between a CPU and an external I/O chip-set. Throughput is further increased by holding data from one DMA transfer in the data buffer for use in a subsequent DMA transfer. In one embodiment, the integrated I/O system contains a dedicated memory management unit including a translation lookaside buffer which converts I/O addresses to physical addresses for the processing core.

10 Claims, 3 Drawing Sheets

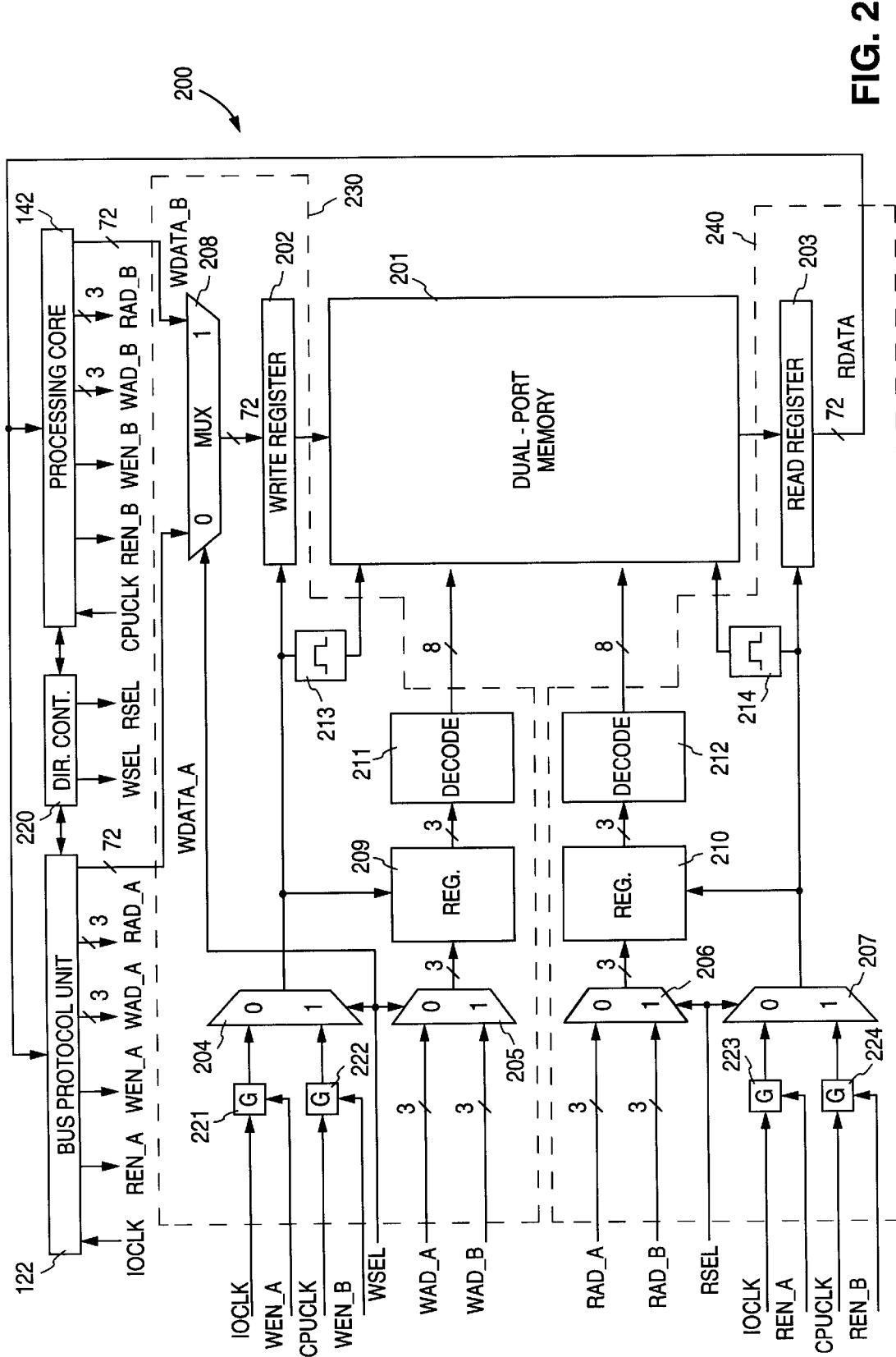

LOW-LATENCY, HIGH-THROUGHPUT, INTEGRATED CACHE COHERENT I/O SYSTEM FOR A SINGLE-CHIP PROCESSOR

CROSS REFERENCE TO RELATED APPLICATION

This application is related to commonly owned, co-filed U.S. patent application Ser. No. 08/659,729 entitled "STRUCTURE AND METHOD FOR BI-DIRECTIONAL DATA TRANSFER BETWEEN ASYNCHRONOUS CLOCK DOMAINS" by Michael A. Csoppenszky and Kevin B. Normoyle, which is hereby incorporated by reference in its entirety.

BACKGROUND OF THE INVENTION

1. Field of the Invention

This invention relates to central processing units and to input/output interfaces for central processing units.

2. Description of Related Art

Most conventional central processing units (CPUs) have some on-chip input/output (I/O) support logic but rely on one or more external components to complete an I/O system for complex bus interfaces. Multi-chip I/O systems have many drawbacks. The number of components in multi-chip systems make them more expensive because of the number of separate components and the increased board area for connection of the components. The larger number of board level components also lowers system reliability and increases latency because signals shuttle between components and possibly through several components in series.

Despite the drawbacks, multi-chip systems are employed because of the complexity of industry-standard I/O bus protocols such as PCI, VESA, and ISA bus protocols. Such industry-standard busses typically have their own clock signals which are independent (i.e. asynchronous) from the main processor clock signal. Forcing the CPU clock and an I/O system clock to be synchronous is undesirable because most CPUs run at much higher clock frequencies than an I/O system. In theory, the CPU clock frequency could be an integer multiple of the I/O clock to keep the two clocks synchronous; but in practice, the extremely tight phase tolerances required for the CPU to maintain internal timing margins are difficult to maintain when clock signal multipliers are employed. Additionally, requiring the CPU clock frequency to be a fixed multiple of the I/O clock frequency makes a system inflexible and may stop the CPU from taking advantage of a faster process and operation. For example, if CPU clock frequency is anchored to the I/O clock by an integer multiple constraint, the CPU frequency could not be increased when a faster process is available unless the I/O clock frequency is increased to maintain the integer multiple. The I/O clock frequency may be fixed for other devices on the I/O bus so that the processor cannot take advantage of the faster process.

An alternative to keeping the CPU clock and I/O system synchronous is allowing the CPU and I/O clocks to be asynchronous, but a reliable single-chip CPU having multiple asynchronous clock domains is difficult to produce. Typically, a large number of signals transferred between clock domains must be synchronized which multiplies the chances of metastability failures. The resulting statistical mean-time-to-failure (MTTF) can be too low which makes such CPUs unsuitable for most applications.

SUMMARY OF THE INVENTION

A cache-coherent I/O system is integrated in a single-chip central processing unit (CPU) which uses an operating protocol and circuits such as synchronizers and data buffers to operate the I/O system in a clock domain that is completely separate from (i.e. asynchronous to) a clock domain using a main CPU clock. In accordance with one embodiment of the invention, the integrated I/O system contains a bus control/protocol unit and an I/O memory management unit which operate in an I/O clock domain; and a processing core for the CPU operates in a CPU clock domain. Synchronizers and data buffers respectively provide control and data communications between the two clock domains. The I/O system achieves a very low latency for data transfers to and from the processing core because the I/O system and processing core are in a single monolithic integrated circuit which eliminates shuttling control signals on and off chip. Additionally, throughput is high because the processing unit and the I/O system both have direct access to a data buffer between them so that no delays are incurred for complex communication mechanisms which are commonly employed between a CPU and an external I/O chip-set.

In accordance with one aspect of the invention, a data buffer between the processing unit and the I/O system is large enough to store one or more cache line from a cache memory attached to the processing core, and the I/O system provides for DMA operations between external devices and memory attached to the processing unit. During DMA operations, the buffer can be filled with a full cache line which is manipulated in a cache coherent manner. When a DMA operation requires data transfer from the memory attached to the processing unit, the I/O system checks addresses for data already stored in the data buffer; and if the data buffer contains valid data corresponding to the request, the I/O system transfers the data from the data buffer to the requesting device without further intervention from the processing unit. The data buffer thus serves the two proposes, buffering data between clock domains and acting as an small cache for DMA operations. The processing unit invalidates data in the data buffer if necessary to maintain data consistency.

BRIEF DESCRIPTION OF THE DRAWINGS

FIG. 2 shows a block diagram of a bi-directional data buffer for the processor of FIG. 1.

Use of the same reference symbols in different figures indicates similar or identical items.

DETAILED DESCRIPTION OF THE PREFERRED EMBODIMENTS

In accordance with an aspect of the invention, a single-chip processing unit includes two separate asynchronous clock domains. A processing core operates in one clock domain, and an I/O interface for a device bus operates in the other clock domain. Data buffers and synchronizers provide low-latency communication between the two clock domains. The synchronizers transfer control signals for data transfers between clock domains, but a system protocol eliminates the need for synchronizing data signals passing through the data buffers and information signals passing directly between clock domains. The protocol improves reliability by decreasing the number of signals requiring synchronization and the number of opportunities for metastability failures created in the interface between asynchronous clock domains.

Figure 1:
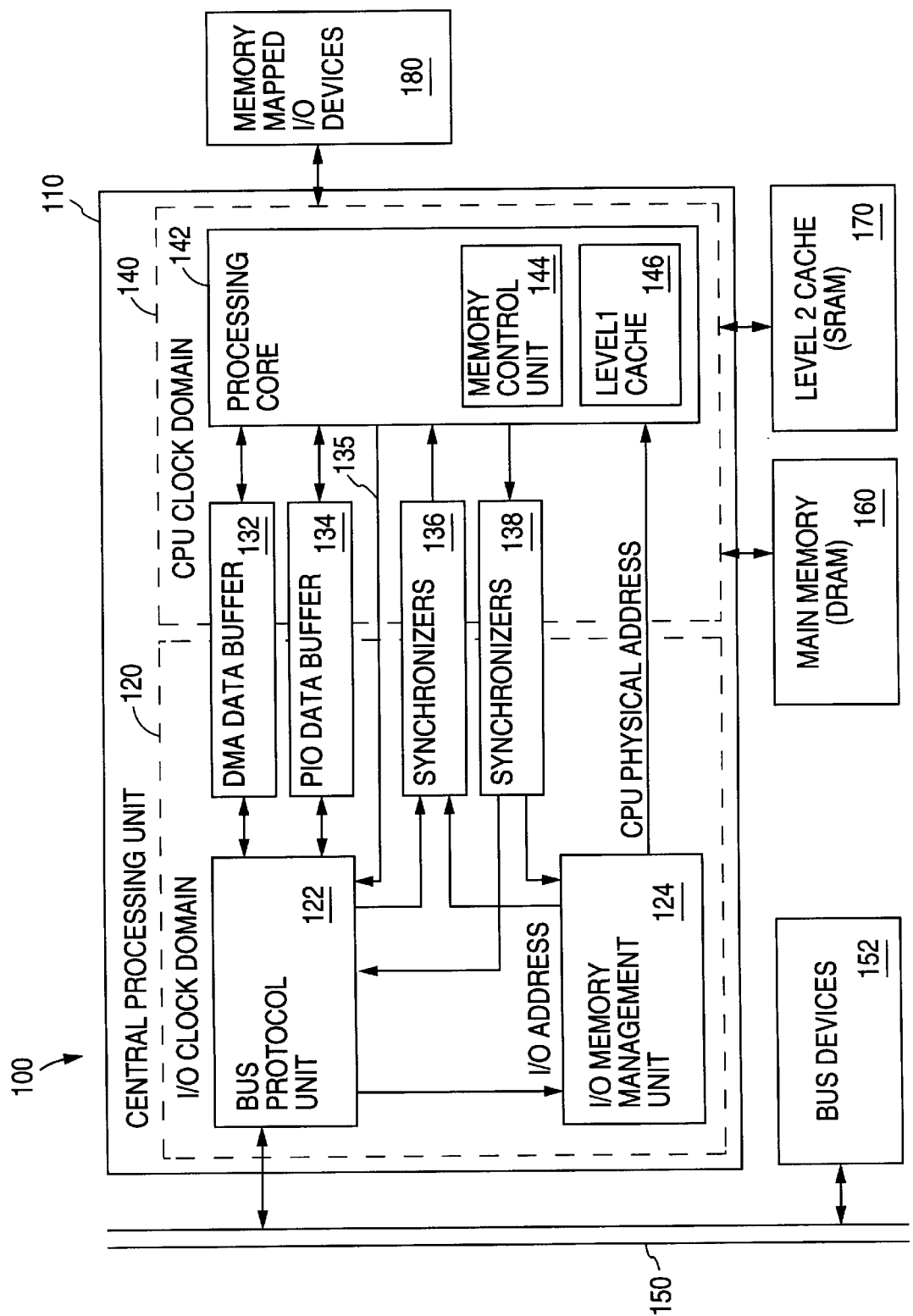
FIG. 1 shows a block diagram of a computer system containing a single-chip processor in accordance with an embodiment of the invention.

FIG. 1 shows an embodiment of a computer system 100 which includes a central processing unit (CPU) 110 that communicates with external devices 152 via an I/O bus 150. CPU 110 is a monolithic integrated circuit which includes two separate clock domains 120 and 140. Clock domain 140, which is sometimes referred to herein as CPU clock domain 140, includes a processing core 142 which implements primary processing functions of CPU 110 including accesses of a main memory 160 via a level 1 cache 146 and a level 2 cache 170. CPU clock domain 140 and processing core 142 operate in response to a clock signal CPUCLK which has a frequency that depends on the rated speed of CPU 110. In an exemplary embodiment of the invention, main clock signal CPUCLK has a frequency between about 132 MHz and about 250 MHz.

Clock domain 120, which is sometimes referred to herein as I/O clock domain 120, provides an interface between CPU 110 and devices 152 on I/O bus 150. I/O clock domain 120 operates in response to an I/O clock signal IOCLK which is synchronized with a bus clock signal BUSCLK used for communication on bus 150. For faster operation, clock signal IOCLK can have a frequency which is any integer multiple of the frequency of signal BUSCLK. In the exemplary embodiment of the invention, I/O clock domain 120 implements the industry standard PCI bus protocol which uses a bus clock signal BUSCLK at a frequency up to about 66 MHz; and clock signal IOCLK has twice the frequency of clock signal BUSCLK or up to 132 MHz. Embodiments of the invention are not limited to the PCI protocol but could implement other I/O protocols including but not limited to the ISA or VESA bus protocol. Bus devices 152 can be devices such as a graphics/multimedia card or a sound card.

In CPU 110, I/O clock domain 120 includes a bus protocol unit 122 and an I/O memory management unit (IOMMU) 124 which together implement the desired interface for input and output of information on bus 150. Bus protocol unit 122 generates output command signals, data signals, and device address signals on bus 150 according to the desired bus protocol. Bus protocol unit 122 also interprets signals from bus 150 and from processing core 142 to determine the operations required. In particular, bus protocol unit 122 identifies direct memory access (DMA) operations, interprets I/O address and data signals, and depending on the type of operation, directs data to or retrieves data from a DMA data buffer 132. I/O memory management unit 124 converts I/O addresses to CPU physical addresses for processing core 142. I/O memory management unit 124 is dedicated for use in I/O operations which improves performance of bus protocol unit 122 relative to a bus interface which must share access to a memory management circuit for processing core 142. Providing I/O memory management unit 122 in clock domain 120 also provides greater reliability because signals between bus protocol unit 122 and I/O memory management do not require synchronization.

Processing core 142 includes a memory control unit 144 which transfers data between DMA data buffer 132 and level 1 cache memory 146, level 2 cache memory 170, or main memory 160. For DMA write operations, bus protocol unit 122 directs data from bus 150 to DMA data buffer 132, control signals through synchronizers 136 to processing core 142, and an I/O address to I/O memory management unit 124. I/O memory management unit 124 converts the I/O address from bus 150 to a physical address signal P_ADDRESS for processing core 142. DMA operations can be either cacheable or non-cacheable. For cacheable write operations, memory control unit 144 transfers the data from data buffer 132 according to the location indicated by physical address signal P_ADDRESS. Data for non-cacheable DMA writes are directed to memory mapped I/O devices 180 which are connected to CPU clock domain 140. Memory mapped I/O devices 180 are accessed according to clock signal CPUCLK and occupy a portion of the physical memory space of processing core 142 but are not memory which is accessible through level 1 cache 146 or level 2 cache 170. One example of a memory mapped I/O device is a graphics page buffer of a graphics device.

For DMA read operations, physical address signal P_ADDRESS identifies data which processing core 142 writes to DMA data buffer 132. Memory control unit 144 provides data from processor memory (level 1 cache 146, level 2 cache 170, or main memory 160) for cacheable DMA operations. For non-cacheable operations, memory mapped I/O devices 180 supply the data written to DMA data buffer 132. Bus protocol unit 122 then transfers the data from DMA data buffer 132 to bus 150.

A PIO data buffer 134 is for programmed input/output operations initiated by processing core 142. Processing core 142 generates the desired device addresses which are transferred to bus protocol unit 122 via a direct connection 135 and a control signal passed via synchronizers 138. For a write to one of bus devices 152, memory control unit 144 transfers data to PIO buffer 134, information directly to bus protocol unit 122 via connection 135, and control signals through synchronizers 138 to bus protocol unit 122. The control signals indicate the location and amount of data in data buffer 134. A read from bus 150 is similar except that bus protocol unit 122 transfers requested data from bus 150 to PIO data buffer 136.

FIG. 2 shows an embodiment of a bi-directional dual-port memory system 200 which can be used for a data buffer in the exemplary embodiment of the invention. Concurrently filed U.S. patent application Ser. No. 08/659,729, entitled "Structure and Method for Bi-directional Data Transfer between Asynchronous Clock Domains", describes dual-port memory systems and is incorporated by reference herein in its entirety. Memory system 200 includes a memory 201 which has a write port and a read port that are respectively accessed through a write control circuit 230 and a read control circuit 240. Memory system 200 is bi-direction in that data can be transferred through memory system 200 from bus protocol unit 122 to processing core 142 or from processing core 142 to bus protocol unit 122, but only one direction of data transfer is allowed at a time.

A direction control 220 controls multiplexers 204 to 208 within write and read control circuits 230 and 240 and determines the direction of data transfer by determining which of bus protocol unit 122 and processing core 142 has access to the write and read ports of memory 201. In particular, direction control 220 mediates an asynchronous request and acknowledge sequence between bus protocol unit 122 and processing core 142. Each request signal requests either read or write access to memory 201. In the exemplary embodiment of system 100 (FIG. 1), only bus protocol unit 122 generates request signals for DMA buffer 132, and processing core 142 only acknowledges the requests. Direction control 220 contains synchronizers to synchronize the request signal from bus protocol unit 122 to clock signal CPUCLK and to synchronize the acknowledge signal from processing core 142 to clock signal IOCLK. Direction control 220 generates a write select (WSEL) signal and a read select (RSEL) signal in response to the direction determined from the request signal. Bus protocol unit 122 and processing core 142 keep enable signals WEN_A, REN_A, WEN_B, and REN_B at levels that prevent writing or reading of memory 201 while direction control 220 is switching the direction of data transfer. After signals WSEL and RSEL from direction control 220 have had sufficient time to settle, signals WEN_A, REN_A, WEN_B and REN_B enable reading and writing to memory 201 as described below.

Memory 201 is randomly accessible via address signals WAD_A or RAD_A from bus protocol unit 122 and WAD_B or RAD_B from processing core 142. In the exemplary embodiment, memory 201 contains eight 72-bit storage locations; and address signals WAD_A, RAD_A, WAD_B and RAD_B are 3-bit signals. Each of bus protocol unit 122 and processing core 142 maintains read and write pointers which are initialized at the start of a data transfer, updated in response to control signals and reads or writes performed, and used for generation of signals WAD_A, RAD_A, WAD_B and RAD_B. Multiplexer 205 selects a write address signal WAD_A or WAD_B which register 209 latches and decoder 211 decodes to identify a storage location being written. Multiplexer 206 select a read address signal RAD_A or RAD_B which register 210 latches and decoder 212 decodes to identify a storage location being read. When data is written, control signals are sent to the clock domain having access to the read port to indicate that data is available in memory 201. The clock domain having read access can then read the data. Reads and writes of memory 201 may be performed simultaneously and asynchronously.

In write control circuit 230 are clock gating circuits 221 and 222, multiplexer 204, and a write pulse generator 213 which control the timing of writes to memory 201. Enable signal WEN_A from bus protocol unit 122 enables or disables passing of signal IOCLK through clock gating circuit 221 to multiplexer 204. Enable signal WEN_B from processing core 142 enables or disables passing of signal CPUCLK through clock gating circuit 222 to multiplexer 204. Write select signal WSEL causes multiplexer 204 to pass to write register 202 and write pulse generator 213 the output signal from gating circuit 221 or 222, depending on which clock domain has access to the write port of memory 201. An edge of the signal selected by multiplexer 204 triggers write data register 202 which stores the data signal WDATA_A or WDATA_B selected by multiplexer 208. Write pulse generator 213 generates a write pulse which triggers writing of the value from write data register 202 to memory 201.

Read control circuit 240 control reads in a similar fashion using clock gating circuits 223 and 224, multiplexer 207, and a read pulse generator 214 to control the timing of writes to memory 201. Enable signal REN_A from bus protocol unit 122 enables or disables passing of signal IOCLK through clock gating circuit 223 to multiplexer 207. Enable signal REN_B from processing core 142 enables or disables passing of signal CPUCLK through clock gating circuit 224 to multiplexer 207. Read select signal RSEL causes multiplexer 207 to pass the output signal from gating circuit 223 or 224, depending on which clock domain has access to the read port of memory 201, to read pulse generator 214 and a read register 203. Read pulse generator 214 generates pulses which are synchronized with an edge of the signal from multiplexer 207 and trigger reading from memory 201 data which is stored in read register 203. Both bus protocol unit 122 and processing core 142 are coupled to a bus carrying a data signal RDATA from read register 203, but only the one of bus protocol unit 122 and processing core 142 having access to the read port of memory 201 uses signal RDATA.

In an embodiment of the invention where memory system 200 is the DMA data buffer 132 shown in FIG. 1, bus protocol unit 122 is the controlling device for DMA buffer 132. When one of bus devices 152 initiates a DMA transfer by generating signal according to the protocol for bus 150, bus protocol unit 122 determines whether the DMA operation is a read or write and whether the operation is cacheable or non-cacheable. Cacheable accesses are logically accesses to main memory 160 but more typically access level 1 cache 146 or level 2 cache 170. Non-cacheable accesses are to memory mapped I/O devices 180 which are connected to CPU 110 through CPU clock domain 140 and occupy a portion of the physical address space of processing core 142. Bus protocol unit 122 separates an I/O address from signals on bus 150 and asserts to I/O memory management unit 124 a signal IO_ADDRESS representing the I/O address. If it is necessary to change the direction of data transfer through DMA data buffer 132 to match the requested DMA read or write, bus protocol unit 122 also generates a request signal to DMA buffer 132.

IOMMU 124 contains a translation lookaside buffer (TLB) containing entries which map I/O addresses to CPU physical addresses. U.S. Pat. No. 5,802,568, entitled "Simplified Least-Recently-Used Entry Replacement in Associative Cache Memories and Translation Lookaside Buffers", describes translation lookaside buffers and is incorporated by reference herein in its entirety. If there is a miss in IOMMU 124, a new entry is required to determine the CPU physical address. In the exemplary embodiment, IOMMU 124 obtains new TLB entries from memory control unit 144 in processing core 142 using a programmed I/O operation which transfers the new entry from memory control unit 144 to IOMMU 124 via PIO data buffer 134. Programmed I/O operations are described below. If there is a hit in IOMMU 124, signal P_ADDRESS representing the resulting CPU physical address is asserted to processing core 142, and a second signal PA_AVAILABLE indicating that the physical address is available and valid is sent through synchronizers 136 to processing core 142. Memory control unit 144 can then latch the CPU physical address for subsequent memory access.

For a DMA write operation, DMA data buffer 132 is configured for data transfer from bus protocol unit 122 to processing core 142. Bus protocol unit 122 generates a DMA write request DMA_WR_REQ signal which synchronizers 136 synchronize for processing core 142. Signal DMA_WR_REQ indicates that a DMA write is beginning. Bus protocol unit 122 begins writing data from bus 150 to DMA data buffer 132, and for each 72-bit word written generates a pulse in a control signal DMA_WR_WRPTR_EN sent to synchronizers 136. Processing core 142 increments its write pointer in response to each pulse in the version of signal DMA_WR_WRPTR_EN synchronized for clock domain 140 and can read a word of data from DMA buffer if its read pointer trails its write pointer. For each word read from DMA data buffer 132, processing core 142 generates a pulse in a signal DMA_WR_RDPTR_EN, and bus protocol unit 122 increments its read pointer in response to each pulse in a version of signal DMA_WR_RDPTR_EN synchronized for clock domain 120. Bus protocol unit 122 indicates completion of writing to DMA data buffer 132 using a signal BTU_BUFWR_DONE passed through synchronizers 136, and processing core 142 indicates completion of reading from DMA data buffer 132 using a signal DMA_READ_DONE passed through synchronizers 138.

In the exemplary embodiment, DMA data buffer 132 contains eight words where each word is 72 bits, a 64-bit (or 8-byte) data value and an 8-bit, byte-enable value. Accordingly, DMA data buffer 132 holds 64 bytes of data which is the cache line size for level 1 and 2 caches 146 and 170. Each cacheable operation is a transfer of one cache line (one DMA buffer full) of data. Non-cacheable operations which transfer data to or from memory mapped I/O device 180 can be fewer than 64 bytes if desired.

For a DMA read operation, DMA data buffer 132 is configured for data transfer from processing core 142 to bus protocol unit 122. Bus protocol unit 122 generates a DMA read request signal DMA_RD_REQ which synchronizers 136 synchronize for processing core 142. Processing core 142 begins writing data to DMA buffer 132 after latching the CPU physical address from IOMMU 124. For each word of data written, processing core 142 generates a pulse in a signal DMA_RD_WRPTR_EN sent to synchronizers 138, and the write pointer in bus protocol unit 122 increments in response to each pulse in a version of signal DMA_RD_RDPTR_EN synchronized for clock domain 120. Bus protocol unit 122 reads a word of data from DMA data buffer 132 and transfers the data to a device 152 via bus 150. Bus protocol unit 122 asserts pulses in a signal DMA_RD_RDPTR_EN and processing core 142 increments its read pointer in response. Processing core 142 indicates completion of writing to DMA data buffer 132 by asserting a signal DMA_WR_DONE to synchronizers 138.

Buffer protocol unit 122 can generate a control signal to cancel a DMA read operation if an error is detected which would indicate that the DMA should not occur. An example error that might cause buffer protocol unit 122 to abort a DMA read operation is a parity error in an address signal from bus 150 or a protection error detected by IOMMU 124 for the memory being access.

After a DMA read operation, DMA buffer 132 holds a cache line of information. In a following DMA read operation, bus control unit 122 checks to determine whether requested data is already in DMA data buffer 132. If so, data can be transferred from DMA data buffer 132 without processing core 142 becoming involved. To support this functionality, memory control unit 144 generates a signal INV_DMA_BUF to synchronizers 138 when processing core 142 changes data in represented in DMA data buffer 132 so that an invalid copy of the data is not used.

Processing core 142 initiates programmed I/O operations during which data is transferred through PIO data buffer 134. PIO buffer 134 may be implemented in the same fashion as DMA buffer 132; but in the exemplary embodiment, PIO data buffer 134 is a conventional first-in first-out (FIFO) buffer having a selectable direction of data transfer. Processing core 142 controls the direction of data transfer through PIO data buffer 134 and can change the direction of data transfer whenever PIO data buffer 134 is empty. Processing core 142 requests a programmed read or write operation by asserting a signal PIO_RD_REQ or PIO_WR_REQ to synchronizers 138. Before initiating a programmed I/O operation, processing core 142 generates a signal PIO_INFO indicating an I/O address, byte enables, and a size for the programmed I/O operation and then asserts a signal WR_REQ_SYNC_READY or RD_REQ_SYNC_READY to synchronizers 138 to indicate that signal PIO_INFO is valid. Bus protocol unit 122 then latches signal PIO_INFO for later use.

For a write to one of bus devices 152, processing core 142 writes data to PIO data buffer 134 until all data is transferred or PIO data buffer 134 asserts a full flag. Bus protocol unit 122 reads from PIO data buffer 134 and transfers data read to the device indicated by previously latched signal PIO_INFO. Translation lookaside entry transfer is a special case of a PIO write where bus protocol unit 122 transfers data from PIO data buffer 134 to IOMMU 124 and not to bus 150. To signal a PIO operation for transfer of a translation table entry, processing core 142 asserts a signal TTE_GNT to synchronizers 138 instead of signal PIO_RD_REQ or PIO_WR_REQ.

For a read from a bus device 152, bus protocol unit 122 generates signals to the bus device 152 indicated by the address field of signal PIO_INFO which cause that device to transfer data back to CPU 110 on bus 150. Bus protocol unit 122 then writes the data to PIO data buffer 134 until all data transferred has been written or PIO data buffer 134 asserts a full flag. Processing core 142 reads from PIO data buffer 134 when an empty flag from PIO buffer 134 is not asserted.

In system 100 of FIG. 1, synchronizers 136 and 138 synchronize control signals required for operation of data buffers 132 and 134, but data buffers 132 and 134 eliminate the need to synchronize every data bit and thereby save chip area which would otherwise be required for synchronizers. Elimination of synchronizers improves reliability because each synchronizer has a statistical chance of providing an output signal that is neither logic high nor logic low. The data transfers between clock domains 120 and 140 also have low latency because control and handshaking signals propagate within a single chip and direct accesses to data buffers 132 and 134 are allowed.

Figure 3A:
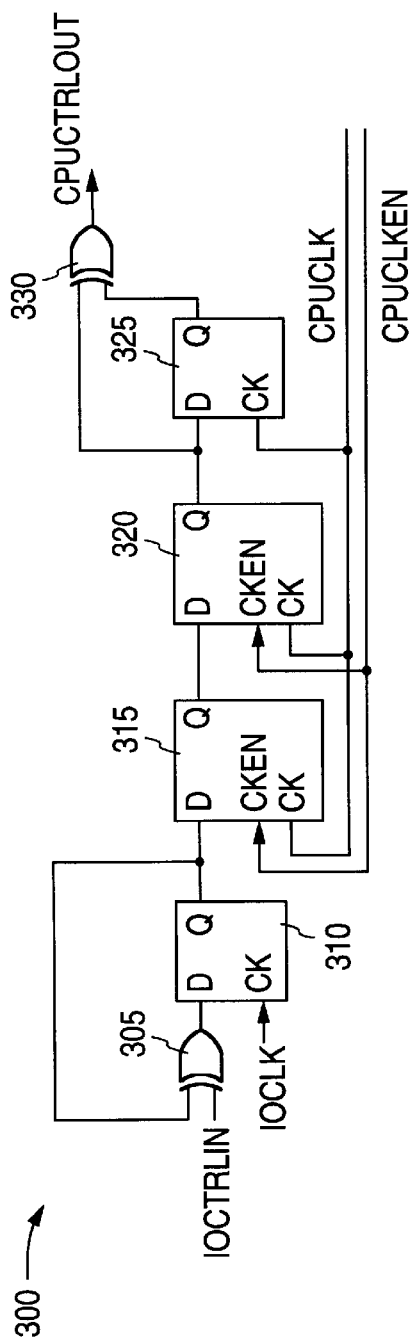
FIGS. 3A and 3B show circuit diagrams of synchronizers for the processor of FIG. 1.
Figure 3B:
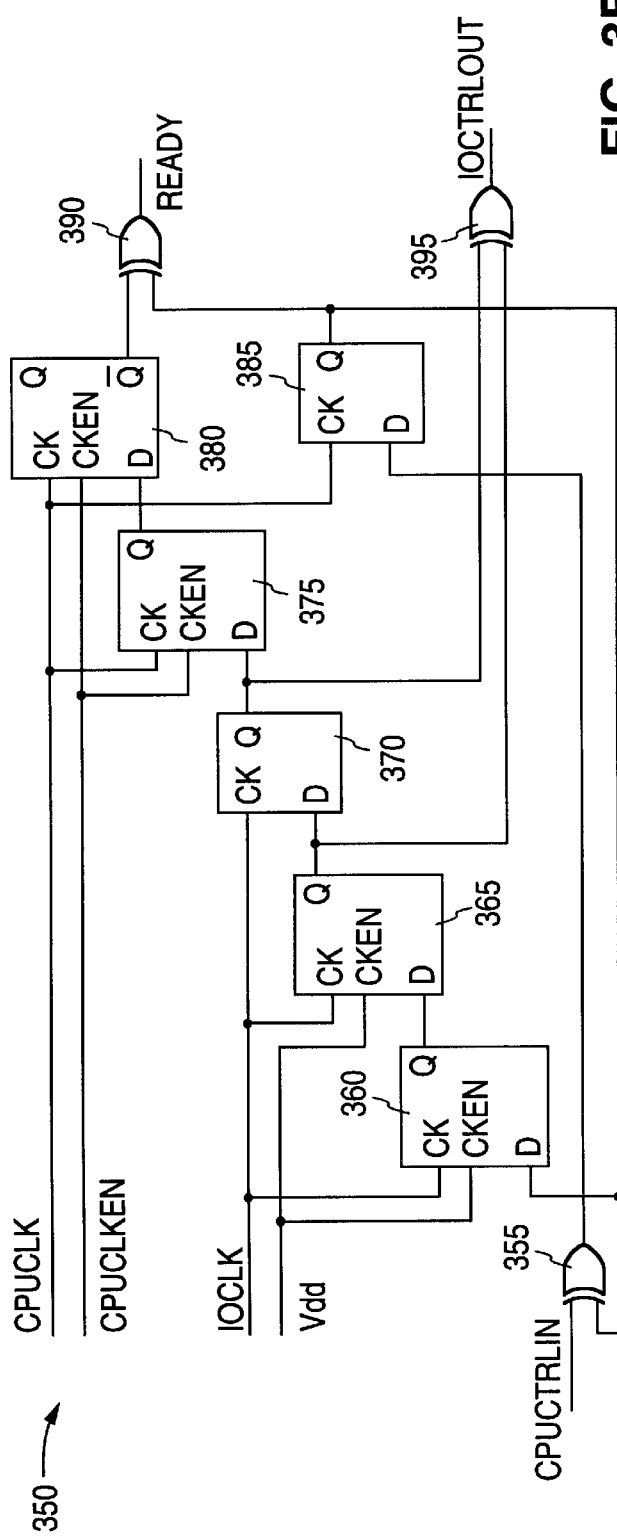

Synchronizers are well known circuits that convert input signals that are not synchronized with a desired clock signal to output signals having transitions aligned with the desired clock signal. FIGS. 3A and 3B respectively show exemplary synchronizers 300 and 350 which can be used between clock domains 120 and 140.

Synchronizer 300 of FIG. 3A is an example of a circuit which converts a generic input control signal IOCTRLIN generated in clock domain 120 to an output control signal CPUCTRLOUT synchronized for clock domain 140. Signal IOCLK, which is twice the frequency of bus clock signal BUSCLK, controls the timing of signal IOCTRLIN, and for proper operation of synchronizer 300, signal IOCTRLIN is restricted to containing pulses which are one clock cycle of signal IOCLK long.

Synchronizer 300 contains four flip-flops 310, 315, 320, and 325 which are connected in series with data output terminals Q of one flip-flop connected to data input terminals D of the next flip-flop. Output signals of flip-flops 310, 315, 320, and 325 are initially either all low or all high. An XOR gate 305 receives input signal IOCTRLIN on one input terminal and the output signal from flip-flop 310 at a second input terminal. An output signal from XOR gate 305 matches the output signals from flip-flop 310 when signal IOCTRLIN is low. When signal IOCTRLIN is asserted, the output signal from XOR gate 305 changes state, and the change propagates through flip-flops 310, 315, 320, and 325. XOR gate 330 asserts signal CPUCTRLOUT when the change reaches to flip-flop 325.

More specifically, flip-flop 310 is triggered by a clock signal IOCLK which has a frequency up to 132 MHz in the exemplary embodiment. When signal IOCTRLIN is assert, the output signal from flip-flop 310 transitions at a rising edge of signal IOCLK. At the next rising edge of signal IOCLK, signal IOCTRLIN is low because pulses in signal IOCTRLIN are one clock cycle long, but the output signal from XOR gate 305 does not change because the output signal from flip-flop 310 changes simultaneously with the change in signal IOCTRLIN. Accordingly, the output signal from flip-flop 310 remains fixed for at least two cycles of signal IOCLK and changes at a rate less than 66 MHz in the exemplary embodiment.

A clock enable signal CPUCLKEN and clock signal CPUCLK control triggering of flip-flops 315 and 320 and must provide an effective frequency greater than or equal to the frequency of the output signal from flip-flop 310. In the exemplary embodiment, clock enable signal CPUCLKEN enables triggering of flip-flop 315 and 320 every other cycle of signal CPUCLK so that flip-flops 315 and 320 are triggered at a rate between 66 MHz and 125 Mhz for CPU clock frequencies between 132 MHz and 250 MHz. Halving the effective triggering rate gives flip-flop 315 and 320 more time to settle and reduces the chance of output signals from flip-flops 315 and 320 being between logic high and logic low levels. To further decrease metastability, flip-flops 315 and 320 have a high gain bandwidth product to quickly resolve metastable states.

The change in the output signal from flip-flop 310 propagates through flip-flops 315 and 320 in about four cycles of clock signal CPUCLK and then reaches XOR gate 330 which asserts output signal CPUCTRLOUT high because the changed output signal from flip-flop 320 differs from the output signal from flip-flop 325. The next rising edge of signal CPUCLK triggers flip-flop 325 which has its output terminal coupled to an input terminal of XOR gate 330. If the output signal from flip-flop 320 changes and is equal to the output signal from flip-flop 315, as would be the case if input signal IOCTRLIN contained a single one-cycle pulse, output signal CPUCTRLOUT remains high for only one cycle of clock signal CPUCLK.

Synchronizer 350 of FIG. 3B synchronizes a generic control signal CPUCTRLIN from CPU clock domain 140 to generate a control signal IOCTRLOUT which is synchronized for I/O clock domain 120. Synchronizer 350 also generates a signal READY for CPU clock domain 140 to indicate that synchronization is complete and input signal CPUCTRLIN can be changed. Synchronizer 350 includes six flip-flops 360, 365, 370, 375, 380, and 385 and has two initial states for proper operation. In a first initial state, output signals from all of the flip-flops are low. In a second initial state, output signals from all of the flip-flops are high. Circuitry in CPU clock domain 140 can assert input signal CPUCTRLIN high for a single cycle of clock signal CPUCLK when synchronizer 350 is in either initial state.

An output signal from XOR gate 355 goes high if synchronizer 350 is in the first initial state when signal CPUCTRLIN is asserted. The high logic state from XOR gate 355 propagates through flip-flops 385, 360, 365, 370, 375, and 380 as the flip-flops are triggered. Clock signal CPUCLK triggers flip-flop 385 which sets an output signal from flip-flop 385 high. XOR gate 390 which has a first input terminal coupled to an output terminal of flip-flop 385 and a second input terminal coupled to an inverted output terminal of a flip-flop 380 then deasserts signal READY. Signal CPUCTRLIN is kept low while signal READY is deasserted which keeps the output signals from XOR gate 355 and flip-flop 385 high. Clock signal IOCLK triggers flip-flops 360, 365, and 370 so that the logic high signal from flip-flop 385 propagates to an output terminal of flip-flop 365 in about two cycles of clock signal IOCLK and causes XOR gate 395 to assert signal IOCTRLOUT at a rising edge of clock signal IOCLK. The output signal from flip-flop 370 goes high at the next rising edge of signal IOCLK and causes XOR gate 395 to deassert signal IOCTRLOUT. Accordingly, signal IOCTRLOUT is high during one clock cycle of signal IOCLK and is synchronized with signal IOCLK.

Clock signal CPUCLK triggers flip-flops 375 and 380 when enabled by enable signal CPUCLKEN. As described above, enable signal CPUCLKEN can cut the effective triggering frequency to half of the frequency of clock signal CPUCLK to allow more time for settling of the output signals of flip-flops 375 and 380. XOR gate 395 asserts signal READY when an inverted output signal from flip-flop 380 transitions from high to low. At this point, synchronizer 350 is in the second initial state, and CPU clock domain 140 can assert a pulse in signal CPUCTRLIN whenever required. In the second initial state, asserting signal CPUCTRLIN high causes output from XOR gate 355 to go low, and the low logic state propagates through flip-flops 385, 365, 370, 375, and 380 in the same manner as described above for the high logic state.

Although the invention has been described with reference to particular embodiments, the description is only an example of the invention's application and should not be taken as a limitation. In particular, although specific circuitry for synchronizers and data buffers used in some embodiments of the invention are described, alternative embodiments of this invention may employ other specific types of circuits without departing from the invention. Various other adaptations and combinations of features of the embodiments disclosed are within the scope of the invention as defined by the following claims.

We claim:

1. A single-chip central processing unit comprising:
   a processing core which operates in response to a first clock signal;
   an input/output interface which operates in response to a second clock signal which is asynchronous with the first clock signal;
   a data buffer connected between the input/output interface and the processing core to transfer data between the processing core and the input/output interface; and
   synchronizers connected between the input/output interface and the processing core to transfer control signals between the processing core and the input/output interface, wherein:
   the input/output interface and the processing core include circuitry for implementing direct memory access operations between a device coupled to the input/output interface and a memory coupled to processing core;
   the device coupled to the input/output interface operates synchronously with the first clock signal; and
   the input/output interface further comprises circuitry which before initiating an access of the memory for a DMA operation, compares a first address for the DMA operation to a second address identifying data already in the data buffer, and when the address comparison indicates data requested for the DMA operation is in the data buffer, transfers data for the DMA operation from the data buffer without accessing the memory.

2. The central processing unit of claim 1, wherein data transferred for the DMA operation was written into the data buffer for a preceding DMA operation.

3. The central processing unit of claim 1, wherein the DMA operation is a read.

4. A single-chip central processing unit comprising:
   a processing core that operates in response to a first clock signal;

an input/output interface that operates in response to a second clock signal that is asynchronous with the first clock signal, the input/output interface comprising a memory management unit that operates in response to the second clock signal and converts addresses used by a device coupled to the input/output interface to addresses used by the processing core;

a data buffer connected between the input/output interface and the processing core to transfer data between the processing core and the input/output interface; and synchronizers connected between the input/output interface and the processing core to transfer control signals between the processing core and the input/output interface, wherein the memory management unit is directly coupled to the processing core to provide an address signal indicating an address used by the central processing unit and coupled to the processing core through the synchronizers, wherein the memory management unit asserts the address signal to the processing core and asserts a control signal through the synchronizers to the processing core to indicate that the address signal is valid.

5. The central processing unit of claim 4, wherein the memory management unit comprises a translation lookaside table.

6. The central processing unit of claim 5, wherein interface circuit and the processing core comprise circuitry for transferring translation lookaside table entries through the data buffer to the memory management unit.

7. A single-chip central processing unit comprising:

a processing core which operates in response to a first clock signal;

an input/output interface which operates in response to a second clock signal which is asynchronous with the first clock signal;

a data buffer connected between the input/output interface and the processing core to transfer data between the processing core and the input/output interface, wherein the data buffer comprises:

a first data buffer coupled to transfer data for DMA transfers between devices coupled to the input/output interface and memory coupled to the processing core; and a second data buffer for data transfers programmed by the processing core; and synchronizers connected between the input/output interface and the processing core to transfer control signals between the processing core and the input/output interface.

8. The central processing unit of claim 7, wherein the processing core is directly coupled to the input/output interface to provide an information signal for a data transfer programmed by the processing core and coupled to the input/output interface through the synchronizers, wherein the processing core asserts the information signal to the input/output interface and asserts a control signal through the synchronizers to the input/output interface to indicate that the information signal is valid.

9. A method for operating a computer, comprising:

incorporating a processing core and an input output interface on a monolithic integrated circuit;

operating the processing core in response to a first clock signal;

operating an input/output interface in response to a second clock signal which is asynchronous with the first clock signal;

operating a first memory management unit in the input/output interface in response to the first clock signal, wherein the first memory management unit accesses memory attached to the processing core; and operating a second memory management unit in the input/output interface in response to the second clock signal, wherein the second memory management unit converts device addresses to addresses for the processing core;

transmitting data between the processing core and the input/output interface via a data buffer incorporated within the integrated circuit; and transmitting control signals between the processing core and the input/output interface via synchronizers incorporated within the integrated circuit.

10. The method of claim 9, further comprising transmitting an address signal directly from the second memory management unit to the processing core, wherein a control signal transmitted via the synchronizers indicates when the address signal is valid.

* * * * *